United States Patent [19]

Staedeli

[11] Patent Number: 4,474,275
[45] Date of Patent: Oct. 2, 1984

[54] AUTOMATICALLY ENGAGEABLE JAW CLUTCH

[75] Inventor: Otto Staedeli, Menzingen, Switzerland

[73] Assignee: Maag Gear-Wheel & Machine Co. Ltd., Zurich, Switzerland

[21] Appl. No.: 391,706

[22] Filed: Jun. 24, 1982

[30] Foreign Application Priority Data

Jul. 10, 1981 [CH] Switzerland ............... 4535/81

[51] Int. Cl.³ .................. F16D 23/02; F16D 13/74
[52] U.S. Cl. ......................... 192/67 A; 192/113 B
[58] Field of Search ............ 192/67 A, 53 H, 113 B

[56] References Cited

U.S. PATENT DOCUMENTS

| | | | |
|---|---|---|---|
| 3,362,514 | 1/1968 | Clements | 192/67 A X |
| 3,563,354 | 2/1971 | Sigg | 192/67 A X |
| 3,868,004 | 2/1975 | Clements et al. | 192/67 A |
| 3,899,060 | 8/1975 | Clements | 192/67 A |
| 3,912,060 | 10/1975 | Handke | 192/113 B |
| 4,055,240 | 10/1977 | Clements et al. | 192/67 A |

FOREIGN PATENT DOCUMENTS

| | | | |
|---|---|---|---|
| 2135192 | 1/1973 | Fed. Rep. of Germany | 192/67 A |
| 194489 | 3/1967 | U.S.S.R. | 192/67 A |

Primary Examiner—Rodney H. Bonck
Attorney, Agent, or Firm—Werner W. Kleeman

[57] ABSTRACT

A jaw or dog clutch which automatically engages when reaching rotational speed equilibrium possesses an axially displaceable clutch star which is rigidly connected for rotation by means of a first tooth system or set of gear teeth with a drive hub, however, is connected to be axially displaceable, and possesses a second tooth system or set of gear teeth which can be brought to mesh, by axial displacement of the clutch star, with a tooth system or set of teeth, of a power take-off hub. At the clutch star there is rotatably mounted a screw socket which is connected by means of a pair of coarse-pitch threads with the power take-off hub. The screw socket can be entrained in one rotational direction by the clutch star by means of a pawl blocking device. A bearing, by means of which the drive hub and power take-off hub bear upon one another, is arranged radially within the screw socket and forwardly of the remaining parts or components of the jaw clutch to be lubricated located in a channel system where lubricant flows through the jaw clutch under the influence of centrifugal forces. Thus, in all of the operating conditions there is realized, with as low as possible total throughput of lubricant, a sufficient lubrication of all of the components of the jaw clutch.

8 Claims, 4 Drawing Figures

AUTOMATICALLY ENGAGEABLE JAW CLUTCH

BACKGROUND OF THE INVENTION

The present invention relates to an automatically engageable jaw or dog clutch.

Generally speaking, the automatically engageable jaw clutch or dog of the present development is of the type comprising a toothed drive hub and a toothed power take-off hub. There is also provided an axially displaceable clutch star which is rigidly connected for rotation with the drive hub by means of a first tooth system or set of teeth formed at the clutch star, however is connected to be axially displaceable. The clutch star possesses a second tooth system or set of teeth which can be brought into engagement with the tooth system or set of teeth of the power take-off hub by axially displacing the clutch star. A screw socket is rotatably mounted at the clutch star. This screw socket is connected by means of a pair of coarse-pitch threads with the power take-off hub. The clutch star entrains, in one rotational direction, the screw socket by means of a pawl blocking device composed of pawls and a pawl tooth system. A bearing serves to support the drive hub and power take-off hub against one another. Additionally, there is provided a channel system for a lubricant which flows under the action of the centrifugal forces through the jaw or dog clutch, the bearing being supplied with fresh lubricant from a central inlet or flow channel.

According to a state-of-the-art jaw or dog clutch of this type, as disclosed for instance in U.S. Pat. No. 3,563,354, granted Feb. 16, 1971, and the cognate Swiss Pat. No. 499, 735 and German Pat. No. 1,959,184, the bearing, by means of which there are mutually supported the drive hub and the power take-off hub, is arranged axially externally of the space enclosed by the drive hub, the clutch star or spider and the screw socket between a central drive shaft attached to the drive hub and a hollow shaft secured at the power take-off hub. The central inlet channel extends from the end of the drive shaft attached at the drive hub through such drive hub and terminates at radial channels in the drive shaft which, in turn, open at a guide bushing enclosing the drive shaft with radial clearance. The guide bushing is attached by means of a flange at the power take-off hub and is provided at its outer surface with a cylindrical guide surface at which there is displaceable the screw socket. Machined at the guide bushing are two sets of radial channels arranged at an axial spacing from one another, both of these sets of radial channels terminating at the cylindrical guide surface for the screw socket. Circumferentially about the guide surface the screw socket is provided with two grooves or recesses arranged at an axial spacing from one another, which are connected with the pawl teeth and the coarse-pitch threads of the screw socket or spider by channels machined therein. With the clutch disengaged the screw socket assumes a position where its grooves or recesses enclose the channels in the guide bushing, so that the lubricant oil can flow from the central inlet or inflow channel through the guide bushing and through the screw socket, on the one hand, to the pawl blocking device and, on the other hand, to the pair of coarse-pitch threads and from that location further to the teeth of the clutch star and the drive hub and power take-off hub. During engagement of the jaw clutch the screw socket is screwed towards the power take-off hub, and both of its grooves or recesses are separated from the channels of the guide bushing, so that there is interrupted, on the one hand, the direct lubricant supply of the pawl blocking device and, on the other hand, the pair of coarse-pitch threads by the screw socket. However, a set of channels in the guide bushing is completely freed by the screw socket, so that the lubricant now predominantly reaches the continuously meshing teeth of the drive hub and the clutch star, between which there can arise continuous relative movements, when the clutch is engaged, owing to axial alignment errors of both shafts which are coupled with one another. Independent of whether the prior art jaw or dog clutch is engaged or disengaged, a portion of the lubricant which arrives through the central inlet channel into the interior of the jaw clutch flows outwardly through the bearing. This portion of the lubricant is then no longer available for the lubrication of the remaining parts or components of the jaw clutch. It is therefore necessary to ensure, by means of an appreciable excess of lubricant conveyed by an external pump, that the pawl blocking device, the pair of coarse-pitch threads and the teeth of the jaw clutch also will be then sufficiently lubricated if, with gradually increasing bearing temperature which arises during operation, an increasingly greater part of the lubricant outflows through the bearing. However, this means that during certain operating conditions, for instance with relatively cold bearing, the mentioned remaining parts or components of the jaw clutch will have an excessive amount of lubricant flowing therethrough. Hence, in particular, with disengaged jaw clutch, on the one hand, there can arise increased power losses, and, on the other hand, however there is not ensured at all for an adequate supply of all of the part or components with fresh, cooled lubricant, since in certain hollow spaces of the clutch there can arise a dam-up phenomenon where the lubricant tends to excessively heat-up.

SUMMARY OF THE INVENTION

Therefore, with the foregoing in mind it is a primary object of the present invention to provide a new and improved construction of a jaw or dog clutch of the character described which is not associated with the aforementioned drawbacks and limitations of the prior art heretofore discussed.

Another and more specific object of the present invention aims at providing a new and improved construction of jaw or dog clutch of the character described which automatically engages when there is reached a rotational speed equilibrium condition, and which jaw or dog clutch is designed such that in all operating conditions, with as low as possible total throughflow of lubricant, there is ensured for an adequate lubrication of all of the parts or components of the jaw or dog clutch.

Yet a further significant object of the present invention relates to a new and improved construction of jaw or dog clutch of the character described, which is relatively simple in construction and design, extremely economical and reliable in operation, not readily subject to breakdown or malfunction, and requires a minimum of maintenance and servicing.

Now in order to implement these and still further objects of the invention, which will become more readily apparent as the description proceeds, the jaw or dog clutch of the present development is manifested by the features that, the bearing is arranged radially within the screw socket and forwardly of the remaining parts or components of the jaw clutch which are to be lubricated and located within the channel system. In other words, the remaining parts of the jaw clutch through which should flow the lubricant are connected in series with the bearing in such a manner that the lubricant always initially flows through the bearing and then through the remaining parts or components. It can be presupposed that with a jaw or dog clutch of the type here under discussion the shaft, which is designated herein as the power take-off shaft, also then rotates when the clutch is disengaged. The jaw clutch is provided for that situation where an already running machine, to which belongs the power take-off shaft, an additional machine, to which belongs the drive shaft, should be connected into the system as soon as the rotational speed of the drive shaft has reached that of the power take-off shaft. Consequently, the bearing attains its normal operating temperature relatively rapidly and is therefore particularly suitable, as well as also because of its exactly defined bearing gap, for dosing the lubricant flow to the remaining parts or components of the jaw clutch. This also holds true even then when the clutch has been finally engaged, whereby the paths for the lubricant flow have been altered by the jaw clutch. The automatic lubricant flows which occurs through the bearing ensures that, with the clutch engaged and also with the clutch disengaged, there are extensively avoided any dead zones.

According to a further preferred construction of the invention there are formed projections at the region of the bearing at a component or part which continuously revolves during operation of the jaw or dog clutch. These projections act as buckets or vanes of a centrifugal pump. The thus produced centrifugal force which acts upon the lubricant, or in any event which acts upon the lubricant to an increased degree in comparison to a construction devoid of any such projections, sucks or presses the lubricant through the bearing.

Preferably, the projections or equivalent structure are formed at an axial bearing ring. The projections thus constitute part of the bearing, so that there is produced a particularly simple construction.

The axial bearing ring is advantageously arranged radially over the mouth or opening of at least one channel which extends from the central inlet or inflow channel. With this arrangement it is possible to maintain particularly small the flow resistances which must be overcome by the lubricant.

However, it is also possible for a radial bearing shell or bowl of the bearing to be arranged radially over the mouth or channel of at least one channel emanating from the central inlet channel. In this case the lubricant flow or stream branches-off within the radial bearing shell; such however remains arranged forwardly of all of the remaining heretofore discussed parts or components of the jaw or dog clutch, so that the bearing retains its inventive function as a dosing device for the lubricant reaching the remaining parts of the jaw clutch.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures there have been generally used the same reference characters to denote the same or analogous components and wherein.

DETAILED DESCRIPTION OF THE PREFERRED EMBODIMENTS

Figure 1:
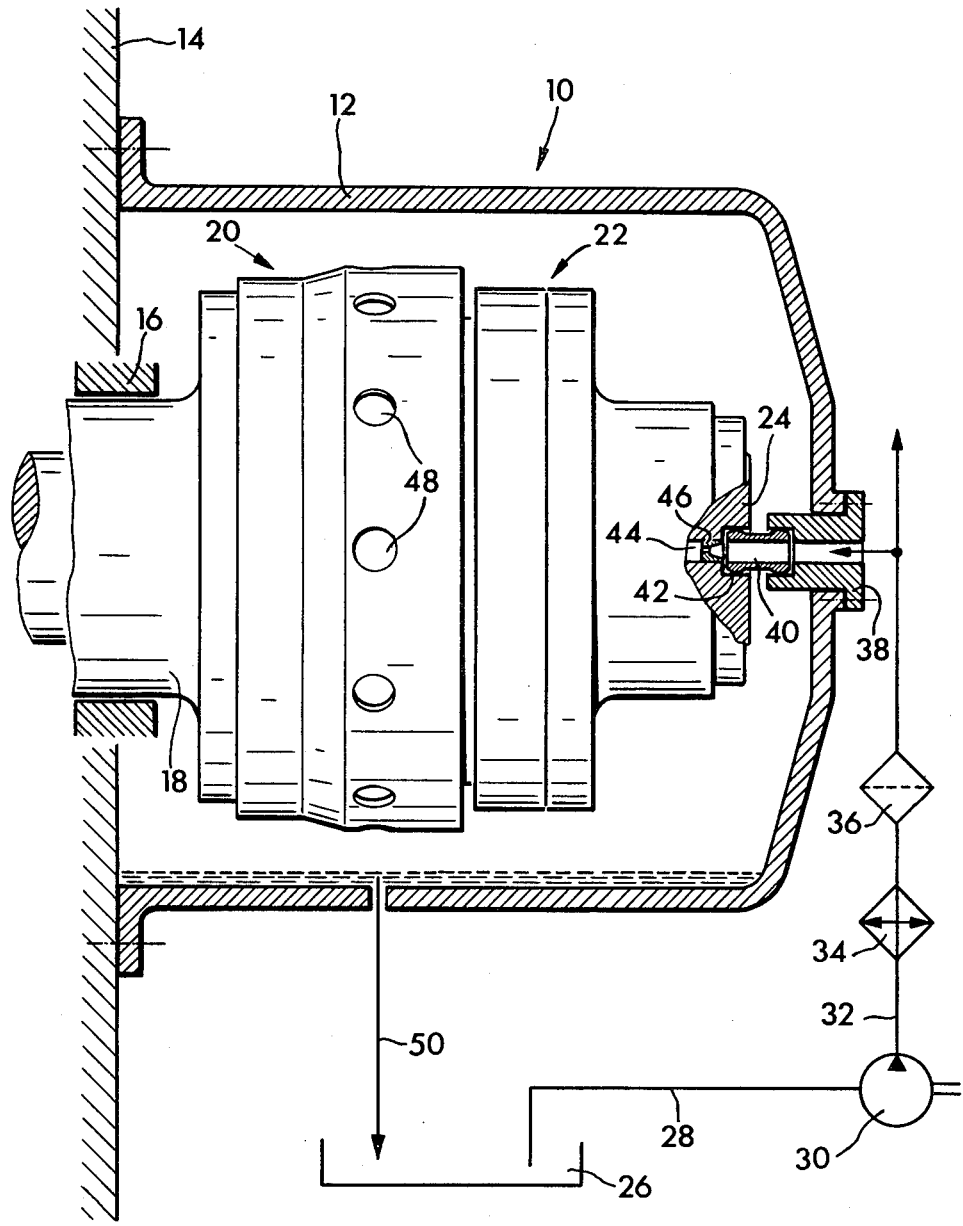
FIG. 1 is a side view of a jaw or dog clutch constructed according to the invention, the illustration constituting a partial sectional view in an axial plane, there also being depicted the related lubricant circulation system.

Describing now the drawings, the jaw or dog clutch 10, illustrated in FIG. 1 as viewed from the outside, is enclosed by a hood member 12 attached to a stationary wall 14. This wall 14 belongs, for instance, to a transmission or gearing housing and supports a bearing 16 in which there is mounted a drive shaft 18 constructed as a hollow shaft.

As to the jaw or dog clutch 10 depicted in FIG. 1, there has been shown a drive hub 20 which is appropriately affixed, for instance bolted, to the drive shaft 18, and a power take-off hub 22 which is suitably attached, again for instance bolted, to a power take-off shaft 24. Additionally, in FIG. 1 there have been shown the parts or components, arranged externally of the actual jaw or dog clutch 10, which serve for the supply of lubricant to such jaw clutch, namely an oil reservoir or container 26 with which there is connected by means of a suction line or conduit 28 a pump 30, and from which pump 30 there leads a pressure line or conduit 32 by means of an oil cooler 34 and an oil filter 36 to a bearing bushing 38 attached within the hood member 12 and extending coaxially with regard to the jaw or dog clutch 10.

Mounted in the bearing bushing 38 is one end of a substantially tubular-shaped intermediate element 40, the other end of which is mounted in a recessed portion or depression 42 provided at the free end of the power take-off shaft 24. Both opposed ends of the intermediate element 40 are configured at the outer surface thereof so as to be substantially spherical, so that the intermediate element 40 can accomplish so-to-speak wobble movements for the purpose of compensating for axial alignment errors between the power take-off shaft 24 and the bearing bushing 36, and thus, can continuously ensure for an oil-tight connection of the power take-off shaft 24 with the pressure line or conduit 32. Leading from the recess or depression 42 is a central inlet or inflow channel 44 which is drilled or otherwise appropriately machined in the power take-off shaft 24. Arranged at the starting portion of the central inlet or inflow channel 44 is a diaphragm 46 or equivalent structure.

Finally, there will be recognized from the showing of FIG. 1 the outlet or exit openings 48 in the drive hub 20, through which there can be radially propelled away the axially infed lubricant, and such discharged lubricant is then entrapped by the hood member 12 and returned back, by means of a return flow line or conduit 50, to the oil reservoir or container 26.

Figure 2:
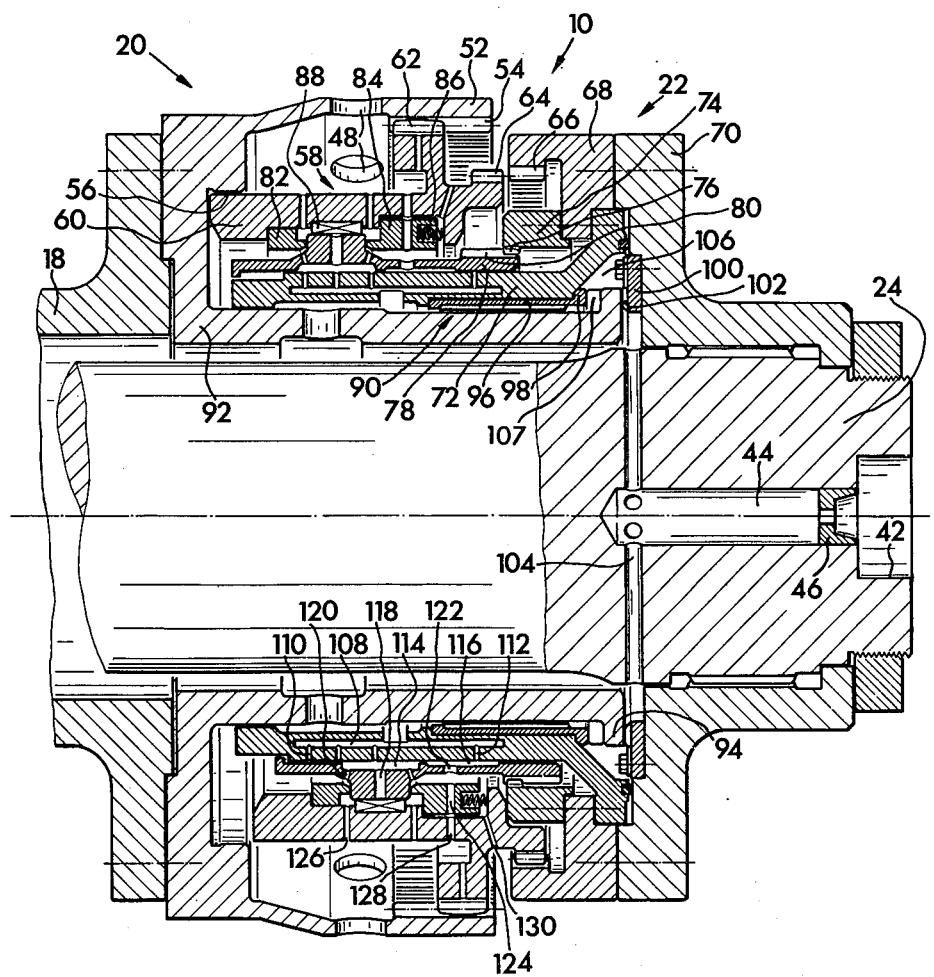
FIG. 2 is an enlarged axial sectional view through the same jaw clutch, the upper-half of the illustration showing such jaw clutch in its disengaged position and the lower-half of the illustration showing the jaw clutch in its engaged position.

The internal construction of an exemplary embodiment of jaw or dog clutch 10 has been illustrated in greater detail in FIG. 2, specifically at the upper half thereof the clutch is shown in its disengaged position and at the lower-half thereof in its engaged position.

The drive hub 20 possesses a substantially sleeve-shaped external part or element 52 provided with straight internal gear teeth 54. Furthermore, a substantially cylindrical inner surface 56 is formed at the drive hub 20. At this cylindrical inner surface 56, in the disengaged position as well as in the engaged position of the jaw clutch 10, there is guided a clutch star or spider 58.

For this purpose the clutch star 58 possesses an outer substantially cylindrical portion 60, the diameter of which is only slightly smaller than the internal diameter of the cylindrical inner surface 56. Formed at the clutch star 58 is a set of straight external gear teeth or tooth system 62 which continuously mesh with the set of straight internal teeth or tooth system 54 of the drive hub 20. Furthermore, there is formed at the clutch star 58 a set of helical external gear teeth 64 which can be meshingly engaged with a set of helical internal gear teeth 66 which belong to the power take-off hub 22.

The helical internal teeth 66 are formed at a toothed rim 68 which is, for instance, flanged or bolted with a flange portion 70 of the power take-off shaft 22 and which is attached at the power take-off shaft 24. Furthermore, belonging to the power take-off shaft 22 is a guide bushing 72 and a threaded ring member 74, both of which are threadably connected or bolted with the toothed rim 68. The guide bushing 72 extends towards the drive shaft 18 with radial clearance and through the threaded ring member or ring 74, at the inner side of which there is formed a set of coarse-pitch threads 76.

The guide bushing 72 guides a screw socket 78 which encloses or encircles such guide bushing 72. Formed at one end at the outside of the screw socket 78 are coarse-pitch threads 80 which continuously mesh with the coarse-pitch threads 76. The screw socket 78 is fixed in axial direction in relation to the clutch star 58 by two impact or stop rings 82 and 84, the first stop ring 82 of which is attached to the clutch star 58 and the second stop ring 84 of which is supported by means of springs 86 at the clutch star 58, so that it can perform in relation thereto small axial dampening movements in order to avoid impacts or jolts during engagement of the jaw or dog clutch 10.

The clutch star 58 is operatively connected with the screw socket 78 through a pawl blocking device 88 which is constructed such that the screw socket 78 can rotate in the normal operating rotational direction without being hindered by the clutch star 58, but however can be entrained thereby when the rotational speed of the drive shaft 18 has reached that of the power take-off shaft 24 and is just in the process of exceeding the same. In this case, the screw socket 78 which has been entrained by the clutch star 58 in the direction of rotation of the drive shaft 18 screws further into the threaded ring member 74 and entrains the clutch star 58 in axial direction, so that its helical external gear teeth 64 come into meshing engagement with the helical internal gear teeth 66 of the power take-off shaft 22. Details of the pawl blocking device 88 as well as the engagement and disengagement of the jaw or dog clutch 20 need not here be further given since such are well known in this art.

Figure 3:
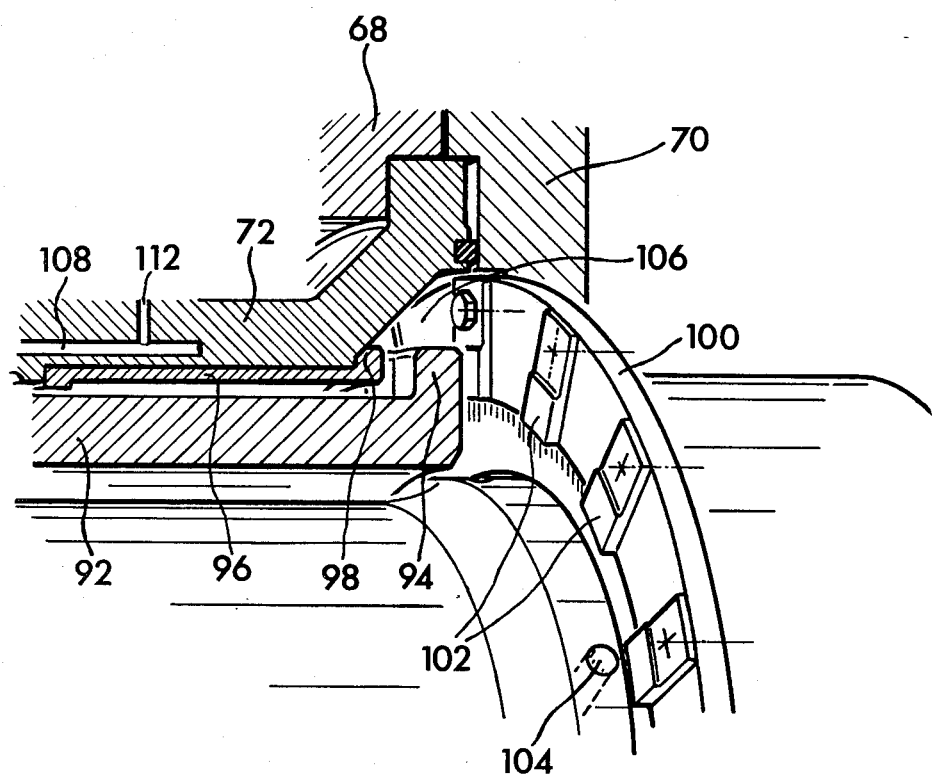
FIG. 3 is a perspective view showing certain details of the jaw or dog clutch depicted in FIGS. 1 and 2.

Internally of the jaw or dog clutch 10 there is formed a bearing 90. This bearing 90 comprises a hollow shaft 92 attached to the drive shaft 18. In the exemplary embodiment under discussion, this hollow shaft 92 is formed of one piece or integrally with the drive hub 20, as shown. The cylindrical outer surface of the hollow shaft 92 forms a bearing surface, and at its one end there is formed an intermediate axial bearing ring 94. Additionally belonging to the bearing or bearing means 90 is a radial bearing shell or bowl 96 formed of a suitable bearing metal, which is fixed internally of the guide bushing 72 and is formed of one-piece or integrally with a second axial bearing ring 98. Finally, also belonging to the bearing 90 is a third axial bearing ring 100 which is attached, for instance bolted, to the flange portion 70 of the power take-off hub 22 and contains a rim of projections or protuberances 102 or equivalent structure which, as best seen from FIG. 3, are arranged at a uniform angular spacing from one another, and the end surfaces of such projections 102 are formed as bearing surfaces. The intermediate axial bearing ring 94 which is formed at the drive hub 20 is therefore guided between the axial bearing rings or ring members 98 and 100 which are affixed to the power take-off hub 22. The bearing or bearing means 90 therefore ensures that the power take-off hub 22 is mounted both in axial direction and in radial direction at the drive hub 20, independent of whether or not the jaw or dog clutch 10 is engaged or disengaged.

For the purpose of providing lubricant flow through the jaw or dog clutch 10 there emanate from the end of the central inlet or inflow channel 44 radial channels 104 which, according to the showing of FIG. 2, open radially within the axial bearing ring 100. During operation of the jaw or dog clutch 10, the axial projections or protuberances 102 of the axial bearing ring 100 function like moving blades or buckets of a centrifugal pump, i.e. they convey the lubricant towards the outside into an annular or ring-shaped chamber or space 106 in which there thus builds-up a lubricant pressure which is dependent upon the rotational speed of the power take-off shaft 2. The lubricant flows out of the ring-shaped chamber 106 between the axial bearing rings 94 and 98, and this lubricant throughflow is facilitated by the provision of radial channels 107 at the intermediate axial bearing ring 94. From that location the lubricant flows through a not particularly referenced bearing gap formed between the radial bearing shell 96 and the cylindrical outer surface of the hollow shaft 92, and this flow can be augmented by means of suitable axial grooves provided in the bearing surface of the radial bearing shell 96. Hence, the lubricant arrives at a distributor channel 108 provided within the guide bushing 72. As will be recognized from FIG. 2, this guide bushing 72 possesses at its left-hand region three sets of closely adjacently situated channels 110 and at its right hand-portion possesses a fourth set of channels 112.

The screw socket 78 possesses at its inner side or surface a groove or recess 114 at the left side thereof and a groove or recess 116 at the right side thereof. In the position assumed by the screw socket 78 according to the upper portion of the showing of FIG. 2 and with the jaw or dog clutch 10 disengaged, the channels or bores 110 open into the left groove or recess 114, whereas the mouths or openings of the channels or bores 112 are covered by the screw socket 78. The lubricant moves from the left groove or recess 114 through a set of intermediate channels 118 of the screw socket 78 into the pawl blocking device 88, whereas the lubricant can flow through two sets of lateral channels or bores 120 to the impact rings or ring members 82 and 84. With the jaw clutch 10 engaged the screw socket 78 assumes the position shown at the lower portion of FIG. 2, where now the channels 112 open into the right groove or recess 116, so that the lubricant can arrive from that location through a fourth set of channels or bores 112 into the screw socket 78 as well as a set of channels 124 in the resiliently supported impact ring member 84 to the clutch star 58.

Machined at the clutch star 58, at both opposed ends of the pawl blocking device 88, is a respective set of channels 126, and somewhat further towards the right a third set of channels 128 which lead to the straight external gear teeth 62, and finally a fourth set of channels 130 which lead to the helical external gear teeth 64 of the clutch star 58.

When the jaw or dog clutch 10 is engaged two of the three set of channels 110 in the guide bushing 72 are covered by the screw socket 78, so that the pawl blocking device 88, which is load relieved in this condition, only has flowing therethrough a reduced quantity of lubricant.

Figure 4:
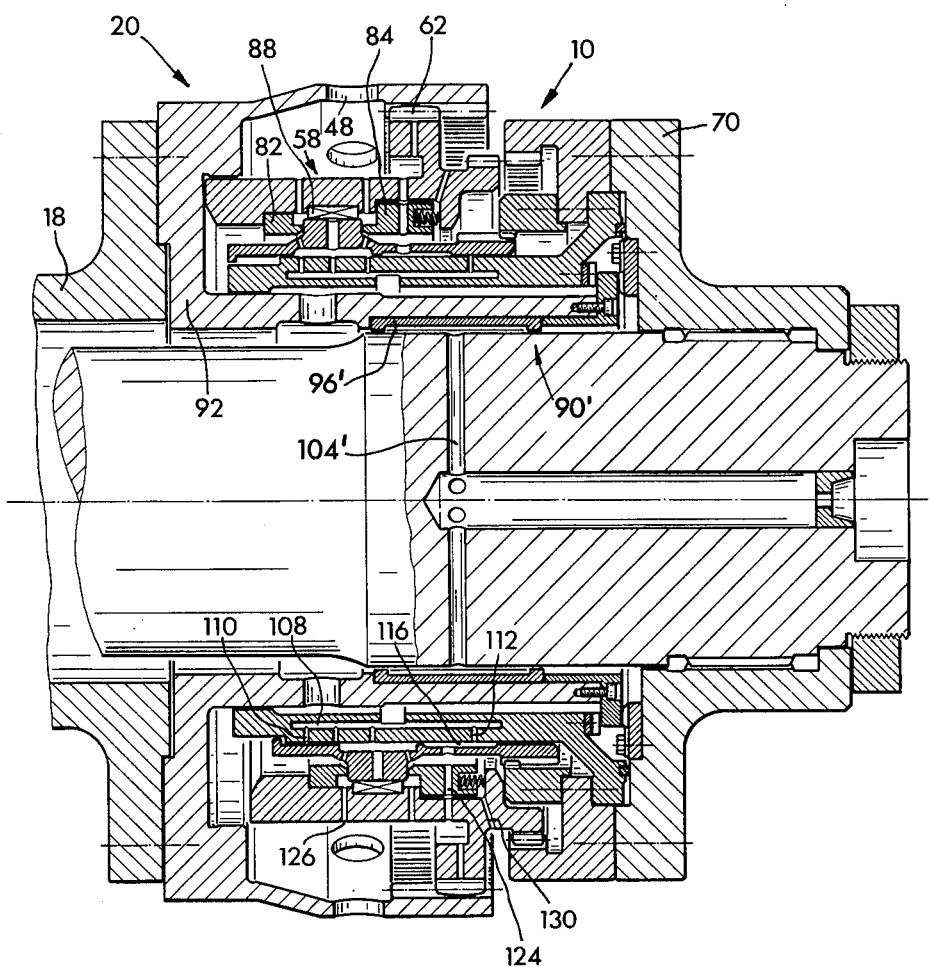
FIG. 4 illustrates a modified construction of jaw or dog clutch in relation to the construction depicted in FIGS. 2 and 3, wherein again in the upper-half of the illustration the jaw clutch is shown in its disengaged position and in the lower-half of the illustration in its engaged position.

The embodiment of jaw or dog clutch 10 depicted in FIG. 4 essentially differs from that illustrated in FIG. 2 in that, here, there is provided, instead of the bearing 90, a bearing 90' which possesses a radial bearing shell or bowl 96' which is attached at the inner surface of the hollow shaft 92, and there emanate from the central inlet or inflow channel 44 radial channels 104' which now open into the axial normal central plane of such radial bearing shell 96'.

While there are shown and described present preferred embodiments of the invention, it is to be distinctly understood that the invention is not limited thereto, but may be otherwise variously embodied and practiced within the scope of the following claims.

Accordingly, what I claim is:

1. An automatically engageable clutch comprising clutch components and bearing means, wherein:
   said clutch components comprise:
   a toothed drive hub;
   an axially displaceable clutch spider having a first tooth system and a second tooth system;
   a screw socket rotatably mounted at the clutch star;
   a pair of coarse-pitch threads for operatively connecting the screw socket with the power take-off hub;
   a pawl blocking device;
   said axially displaceable clutch spider being rigidly connected for rotation by means of the first toothed system formed thereat with the drive hub but being axially displaceable relative thereto;
   said second toothed system being meshable with the teeth of the toothed power take-off hub by axially displacing the clutch spider;
   said screw socket being entrainable in one rotational direction by the clutch spider through the action of said pawl blocking device;
   said bearing means effecting mutual support of said drive hub and said power take-off hub;
   said bearing means being arranged radially within said screw socket;
   said clutch components and said bearing means jointly defining at least one channel system for lubricant which flows through the jaw clutch under the action of centrifugal force;
   said at least one channel system comprising a central inlet channel for supplying the jaw clutch with fresh lubricant; and
   said bearing means being arranged closer to said central inlet channel than said clutch components of the jaw clutch which are to be lubricated and which define said at least one channel system.

2. The jaw clutch as defined in claim 1, further including:
   a functional part located at the region of the bearing means and which continuously revolves during operation of the jaw clutch and defines a portion of said at least one channel system is provided with projections; and
   said projections acting upon the lubricant in said at least one channel system in the manner of blades of a centrifugal pump.

3. The jaw clutch as defined in claim 2, wherein:
   said functional part comprises an axial bearing ring; and
   said projections being formed at said axial bearing ring.

4. The jaw clutch as defined in claim 3, wherein:
   said at least one channel system contains at least one channel emanating from said central inlet channel;
   said at least one channel having a mouth portion; and
   said projections of said axial bearing ring being arranged radially outward of said mouth portion of said at least one channel.

5. The jaw clutch as defined in claim 1, wherein:
   said channel system contains at least one channel emanating from said central inlet channel;
   said at least one channel having a mouth portion; and
   said bearing means having a radial bearing shell which is arranged radially above said mouth portion of said at least one channel.

6. The jaw clutch as defined in claim 1, wherein:
   said at least one channel system contains at least one channel emanating from said central inlet channel;
   said at least one channel having a mouth portion;
   said bearing means comprising an axial bearing ring;
   said axial bearing ring rotating continuously during operation of the jaw clutch and defining a portion of said at least one channel system;
   said axial bearing ring being provided with projections acting upon the lubricant in said at least one channel system in the manner of a centrifugal pump; and
   said projections of said axial bearing ring being arranged radially outward of said mouth portion of said at least one channel.

7. An automatically engageable jaw clutch comprising clutch components and bearing means, wherein:
   said clutch components comprise:
   a toothed drive hub;
   a toothed power take-off hub;
   an axially displaceable clutch star having a first tooth system and a second tooth system;
   screw socket means displaceably mounted at the clutch star;
   a pair of coacting thread means for operatively connecting the screw socket means with the power take-off hub;
   a pawl blocking device;

said axially displaceable clutch star being connected for rotation by means of the first toothed system formed thereat with the drive hub but being axially displaceable relative thereto;

said second toothed system being meshable with the teeth of the toothed power take-off hub by axially displacing the clutch star;

said screw socket means being entrainable in one rotational direction by the clutch star through the action of said pawl blocking device;

said bearing means cooperating with said drive hub and said power take-off hub to provide mutual support thereof;

said bearing means being arranged radially within said screw socket means;

said clutch components and said bearing means jointly defining at least one channel system for lubricant which flows through the jaw clutch under the action of centrifugal forces;

said at least one channel system comprising a central inlet channel for supplying the bearing means with lubricant; and said bearing means being arranged closer to said central inlet channel than predetermined ones of said clutch components of the jaw clutch which are to be lubricated.

8. The jaw clutch as defined in claim 7, wherein:

said bearing means cooperates with one of said hubs to define a bearing gap; and said bearing gap defines dosage means for regulating the flow of lubricant to said clutch components.

* * * * *

UNITED STATES PATENT AND TRADEMARK OFFICE
CERTIFICATE OF CORRECTION

PATENT NO. : 4,474,275
DATED : October 2, 1984
INVENTOR(S) : OTTO STAEDELI

It is certified that error appears in the above—identified patent and that said Letters Patent is hereby corrected as shown below:

Column 3, line 27, after "lubricant" delete "flows" and replace by --flow--

Column 6, line 44, after "shaft" delete "2" and replace by --22--

Column 7, line 11, delete "112" and replace by --122--

Column 7, between lines 46 and 47 (Claim 1, between lines 4 and 5) insert --a toothed power take-off hub;--

Signed and Sealed this

Fifth Day of March 1985

[SEAL]

Attest:

DONALD J. QUIGG

Attesting Officer     Acting Commissioner of Patents and Trademarks